United States Patent
Kim et al.

(10) Patent No.: US 6,902,193 B2
(45) Date of Patent: Jun. 7, 2005

(54) SUPPLEMENTAL RESTRAINT SYSTEM

(76) Inventors: Hoon Y. Kim, 2400 W. Fullerton, Chicago, IL (US) 60647; Hyun S. Kim, 2400 W. Fullerton, Chicago, IL (US) 60647

(*) Notice: Subject to any disclaimer, the term of this patent is extended or adjusted under 35 U.S.C. 154(b) by 0 days.

(21) Appl. No.: 10/177,312

(22) Filed: Jun. 21, 2002

(65) Prior Publication Data

US 2003/0001378 A1 Jan. 2, 2003

Related U.S. Application Data

(63) Continuation-in-part of application No. 10/083,083, filed on Feb. 26, 2002, now Pat. No. 6,820,902, which is a continuation-in-part of application No. 09/968,066, filed on Oct. 1, 2001, now abandoned.
(60) Provisional application No. 60/354,700, filed on Feb. 5, 2002, and provisional application No. 60/236,854, filed on Sep. 29, 2000.

(51) Int. Cl.$^7$ ............................ B60R 22/14; A62B 35/00
(52) U.S. Cl. .................... 280/801.1; 280/808; 280/748; 297/465
(58) Field of Search ................. 297/465, 468, 297/483, 484, 485, 216.11; 2/108, DIG. 3, 69; 128/869; 182/3; 280/801.1, 808, 801.2; B60R 22/14; B62B 35/00; A62B 35/00

(56) References Cited

U.S. PATENT DOCUMENTS

| | | | |
|---|---|---|---|
| 3,954,280 A | 5/1976 | Roberts et al. | |
| 4,026,245 A | 5/1977 | Arthur | |
| 4,226,474 A | 10/1980 | Rupert et al. | |
| 4,302,847 A | * 12/1981 | Miles | ............................ 2/465 |
| 4,422,183 A | * 12/1983 | Landi et al. | .................... 2/455 |
| 4,738,413 A | 4/1988 | Spinosa et al. | |
| 4,927,211 A | 5/1990 | Bolcerek | |
| 5,074,588 A | * 12/1991 | Huspen | .................... 280/801.1 |
| 5,306,044 A | 4/1994 | Tucker | |
| 5,379,725 A | 1/1995 | Roberson et al. | |
| 5,423,087 A | * 6/1995 | Krent et al. | .................... 2/463 |
| 5,429,418 A | 7/1995 | Lipper et al. | |
| 5,730,498 A | * 3/1998 | Hanson et al. | .............. 297/465 |
| 5,733,014 A | 3/1998 | Murray | |
| 5,988,315 A | 11/1999 | Crane | |
| 6,314,578 B1 | 11/2001 | Masuda et al. | |
| 6,364,417 B1 | 4/2002 | Silverman | |
| 6,367,882 B1 | 4/2002 | Van Druff et al. | |
| 6,601,916 B1 | * 8/2003 | Kamiki | .................... 297/250.1 |

FOREIGN PATENT DOCUMENTS

| | | |
|---|---|---|
| DE | DT 26 17 801 A1 | 4/1976 |
| JP | 2002-240678 A * | 8/2002 |
| JP | 2002-294506 A * | 10/2002 |
| WO | WO 93/05986 | 4/1993 |
| WO | WO 94/07710 A1 * | 4/1994 |

\* cited by examiner

*Primary Examiner*—Ruth Ilan
(74) *Attorney, Agent, or Firm*—Welsh & Katz, Ltd.

(57) ABSTRACT

A supplemental restraint system that is easy to use in a vehicle is provided. The user of the system is prevented from the damaging effects of being restrained by a shoulder seat belt combination that provides inadequate support to most of the body and can produce injury at the point of contact with the body during an accident. Further, the supplemental restraint system of the present invention provides the user with a harness to better hold the user to the seat and restraint system of the vehicle. The present invention provides a means of dressing an adult or a child in a restraint harness that may be easily attached within a vehicle and provides the user with restraints that fit the user's height and weight requirements.

10 Claims, 10 Drawing Sheets

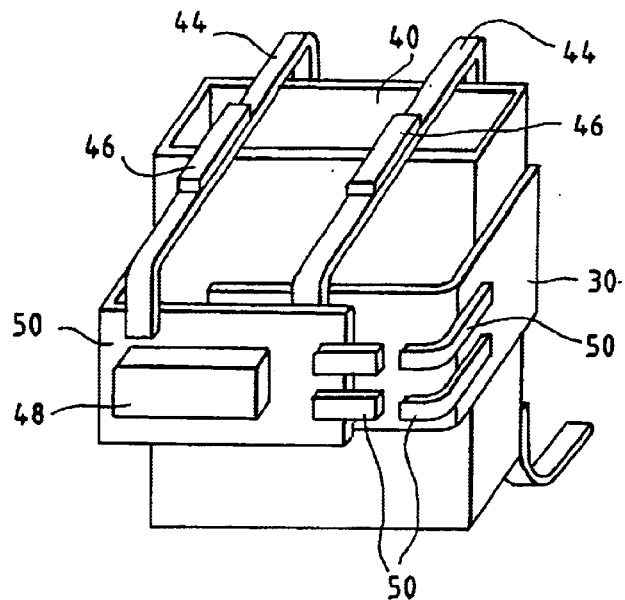
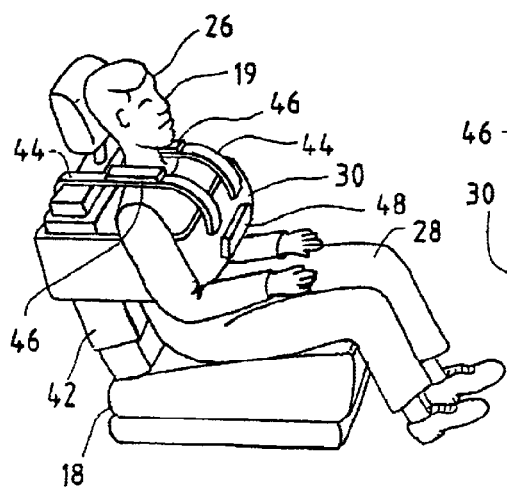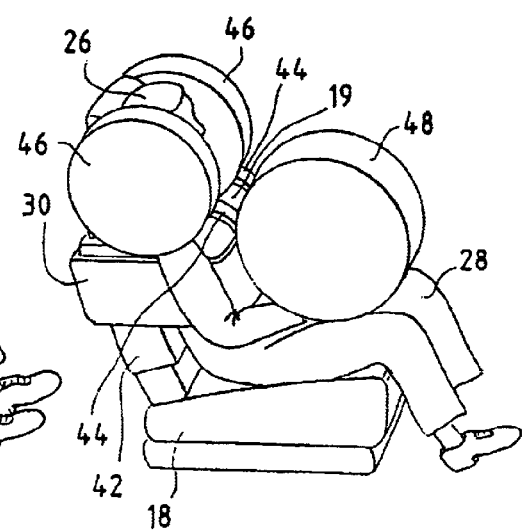

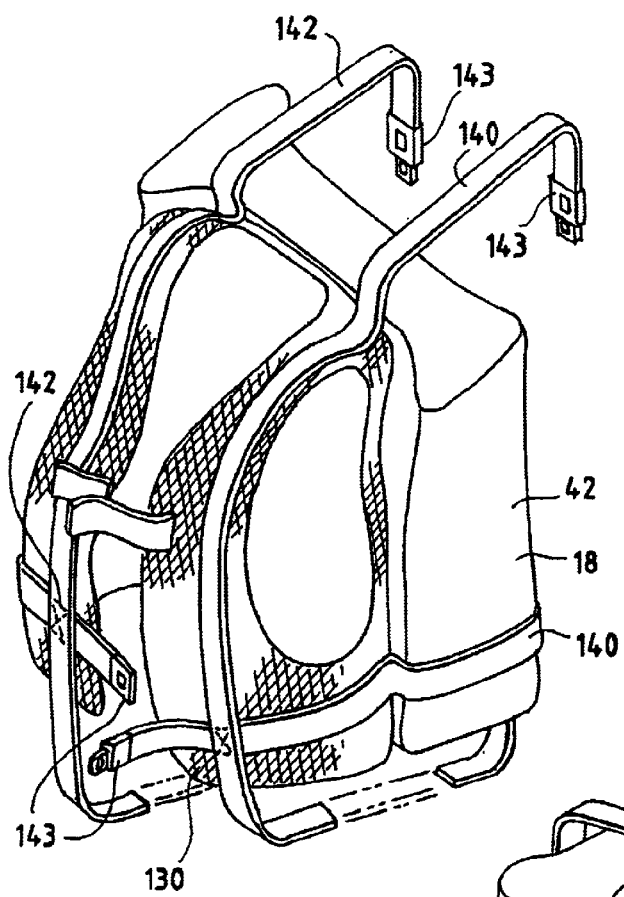
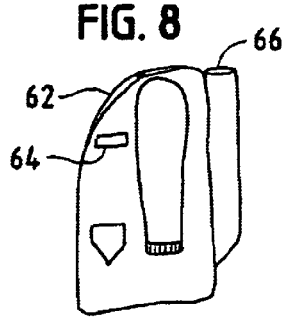
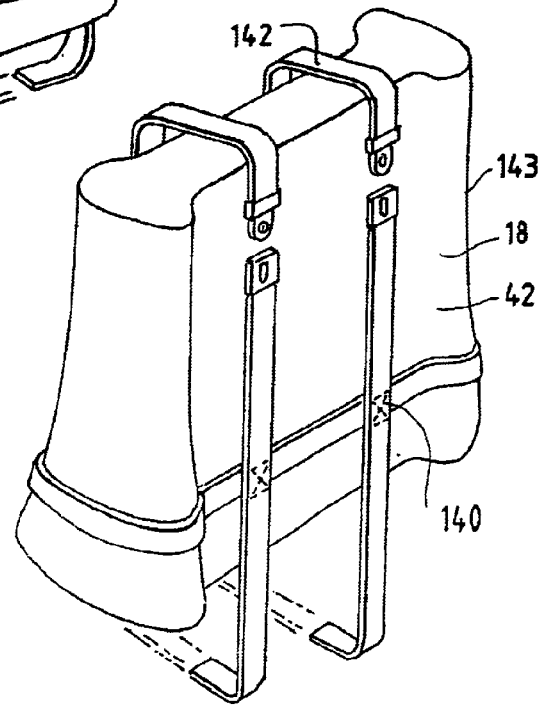

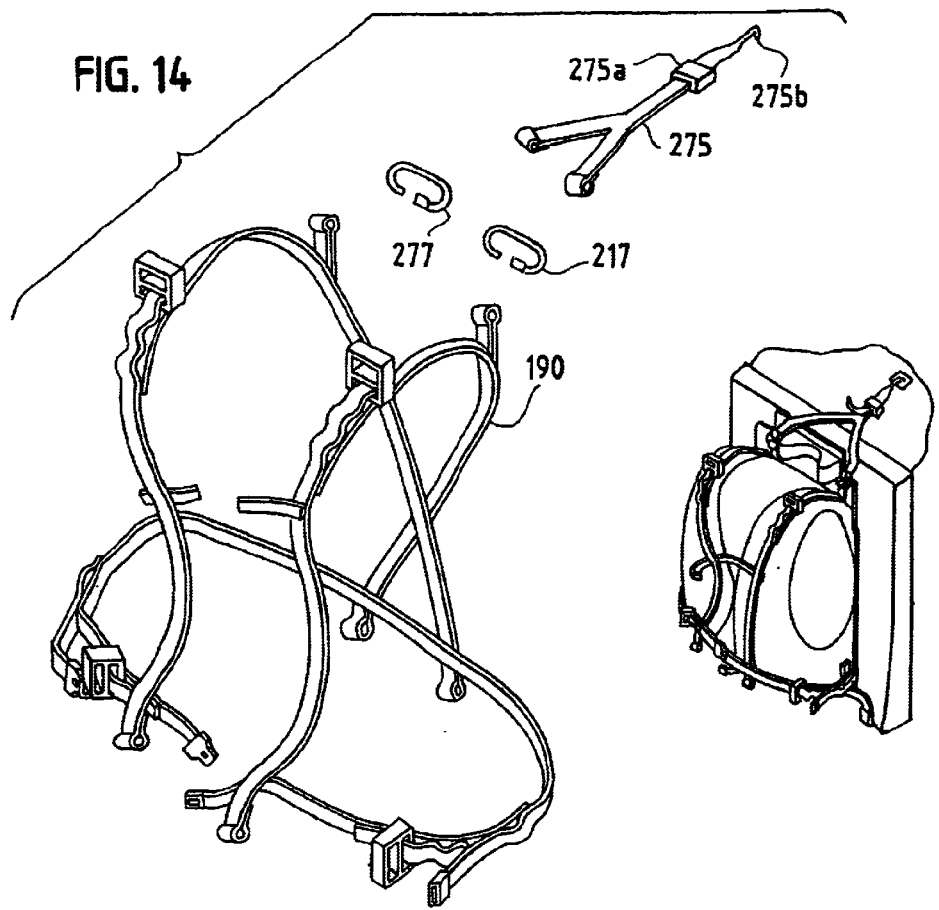
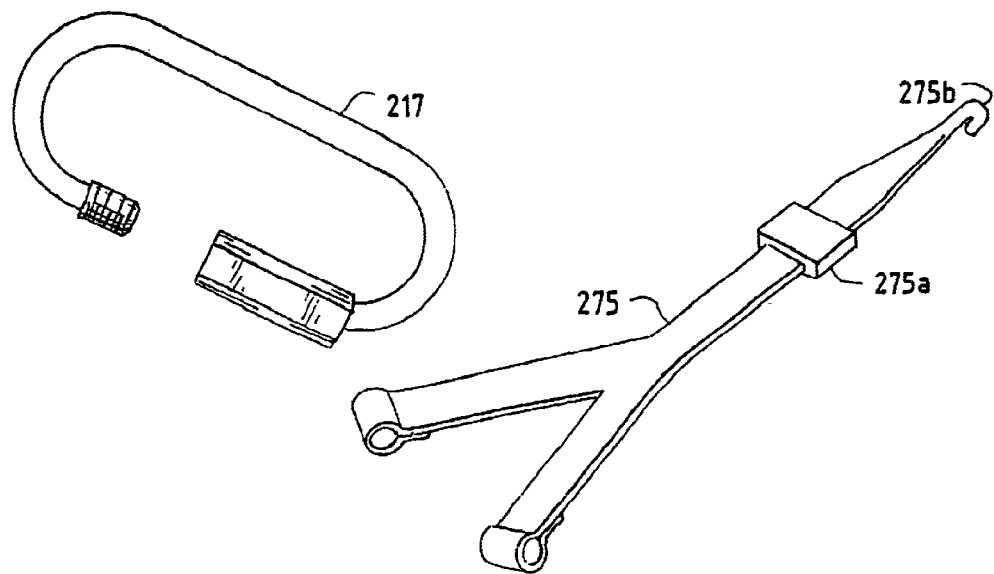

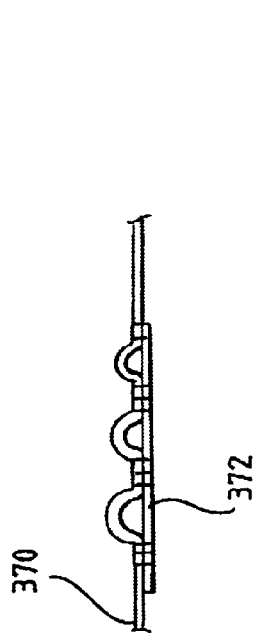
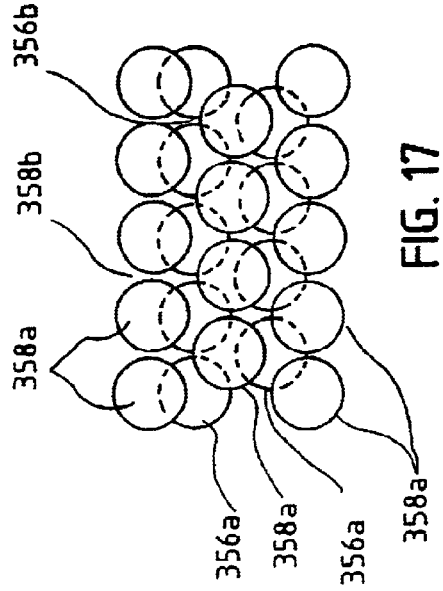
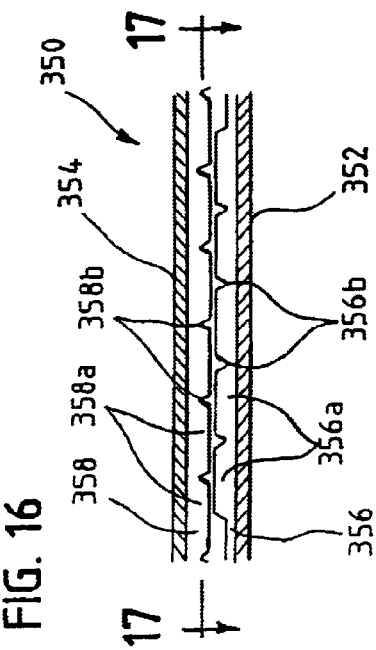

SUPPLEMENTAL RESTRAINT SYSTEM

The present invention claims the benefit of U.S. Provisional Application No. 60/354,700, filed Feb. 5, 2002, and is a continuation-in-part of U.S. patent application Ser. No. 10/083083, filed Feb. 26, 2002, now U.S. Pat. No. 6,820,902, which is a continuation-in-part of U.S. patent application Ser. No. 09/968,066, filed Oct. 1, 2001, now abandoned, and claims the benefit of the filing date of U.S. Provisional Patent Application No. 60/236,854, filed Sep. 29, 2000.

FIELD OF THE INVENTION

The present invention concerns a novel collision survival system for vehicles, specifically the present invention concerns a harness that is worn by the occupants of a car and attaches to the interior of the car, the harness of the present invention is made of materials which aid in the absorption of the energy of the vehicle such that the wearer is better protected from damage caused by sudden stops or collisions.

BACKGROUND

There are approximately 3.2 million fatalities and injuries in the United States every year related to automobile and other vehicle accidents. Medical expenses for the 3.2 million injuries and fatalities amount to approximately $150 billion, exclusive of property damages. Among the 3.2 million fatalities and injuries are approximately 180,000 children under the age of nine.

Currently, safety equipment in vehicles includes the following:

Seat Belts:

Current seat belts are designed to be used in vehicles at any time that an vehicle is running. Often times, vehicle riders do not use their seat belts, generally due to neglect. Further, in case of collision, it has been found that seat belts alone do not provide sufficient protection. It has been determined that certain body parts are not protected by seat belts during collisions, for example, seat belts cannot protect the neck or head area. Also, when seat belts are worn in a collision, the belts cause severe impacts to the body in the areas where they are worn, specifically across the shoulder and belly area.

Air Bags:

Most modern automobiles are provided with air bags. The standard placement of air bags is on the dashboard of the vehicle, generally facing the occupant. When an air bag deploys it typically explodes towards the passenger with great speed and force. Air bags have been known to deploy when not needed, such as when there has not been an accident or when there has been such a slight accident which as not to have required the deployment of the air bag. The deployment of air bags in such cases and in cases of accidents have been known to cause injuries and even fatalities. Further, in cases of severe collisions, air bags have been known to cause severe injury or death to small adults and to children. In addition, the chemical used to inflate the air bag, sodium azide, has been found to be unsafe for some passengers.

Child Restraint Systems:

Most states require that children of a certain age or size be placed in child restraint seats in automobiles. For newborn children and small toddlers the restraints include seats that face towards the rear of the vehicle known as infant car seats. Older children are required to be places in larger forward facing child restraint seats or car seats and/or booster seats. The requirements for booster seats have recently been found to be necessary for older children who are generally smaller, as the booster seat elevated the child so as to allow a standard seat and shoulder belt to lie correctly on the shoulder and mid-section of the smaller child.

The most common problem with these child restraint seats is the fact that most parents do not use the seats properly. When not used properly, these child restraint systems do not protect the child, may be ineffective in preventing injury or death in an accident and can result in injury to the child. These problems could be solved if parents use the child restraints properly. However, because there are a number of manufacturers of these seats and each manufacturer may utilize a different system of securing the seat to the automobile, it is often difficult for parents and others to know how to properly attach the seat.

SUMMARY OF THE INVENTION

The present invention concerns a supplemental restraint system for use in an automobile or vehicle comprising, a harness having restraints for attachment to the seat of an automobile. The harness, which may be of a variety of types, including a series of belts and buckles, or a series of braces and bars resembling a safety cage, or a typical cloth jacket worn as a garment. The jacket and harness elements are constructed of energy absorbing pads and materials which, along with the restraint provided by the jacket and harness, provided energy absorption. The materials used are lightweight and durable and are inexpensive to make and produce in desirable shapes and sizes. The harness or the jacket, or a combination of both, is wearable by a rider in the vehicle such that when the rider wears the harness, jacket or combination, the rider is secured to the seat-belt of the vehicle so that the rider remains secured against the seat of the vehicle notwithstanding the motion of the vehicle.

It will be understood by persons having skill in the art that there are two preferred basic embodiments of the supplemental restraint system that arise from the present invention. Each of these embodiments is tied to the type of restraint system available in the vehicle, either a three point system using a lap and shoulder belt system or a system using merely the lap belt, when that is all that is available. However, other embodiments can be derived without departing from the novel scope of the present invention.

In a vehicle having a three point adult lap and shoulder belt, typically all of the seating positions, with the exception of the rear central position, has both a lap belt and a shoulder belt. As will be explained in greater detail below, and in the detailed description, the lap portion of the vehicle lap and shoulder belt can be routed through a belt guide located along the lower edge of the jacket/harness and the shoulder belt alone is routed through the belt guide located on the shoulder of the jacket/harness.

In the second preferred embodiment, the vehicle has a restraint system comprising solely a lap belt. It will be understood that this system is also descriptive of the center rear position in most vehicles having a shoulder belt for all of the other seating positions. A special elastic top tether is provided for use in conjunction with the second embodiment. As will be described in greater detail below, and in the detailed description, the top tether provides upper torso restraint when using a vehicle lap belt only. The lap belt can be routed through the belt guide located along the lower edge of the jacket/harness; the tether is attached to the jacket/harness at the shoulders and to the vehicle frame at the tether anchor.

In a preferred embodiment, the supplemental restraint system has restraints that comprise a plurality of belts forming a five point type-restraint system with a system of harnesses and harness assembly connectors allowing the connection of the harness to a modern automobile safety restraint harness system. The modem automobile safety restraint system including tether attachment points for front and rear passengers.

In another embodiment, the harness system is attached to either a jacket or a vest that allows the harness to be worn outside of the automobile in a fashionable manner and which is then attachable to the seat portions of the automobile. The jacket, or vest, is constructed using the above noted energy absorbing pads and materials in such a manner as to provide an appealing appearance.

In another embodiment, the supplemental restraint system has a sleeve attached to the jacket or vest, the sleeve being slideable over the back portion of the seat. In this manner, the back of the seat of the vehicle provides bracing force to the jacket or vest. In one embodiment, where the jacket resembles an ordinary cloth jacket, extra material maybe added to the back panel of the jacket to provide the slideable sleeve. The extra material being hidden in the pattern of the material or in the design of the jacket such that the jacket can be worn outside of the vehicle without appearing to be an incomplete or strange garment.

In another embodiment, the restraints comprise belts, having buckles, attached to the harness, jacket or vest and buckled together about the seat.

In another embodiment the jacket, vest or pockets attached to the harness includes air bags, and air bag discharge sensors, strategically placed such that motions which typically cause automobile-type air bags to deploy, cause the jacket, vest or harness air bags to deploy. Further, in one embodiment, the jacket, vest or harness air bags are strategically placed on the garment or harness to provide needed restraint in an air bag deployment incident. Also, in such embodiment, the deployment of the air bags occurs or expands in a direction not diametrically opposite to the movement of the garment or harness such that the bag does not strike the user of the supplemental restraint system head-on. In this embodiment, an air bag that is placed on or near the chest portion of the garment or harness deploys in the direction that the user is travelling so that the user is not struck by the air bag. This embodiment has the added benefit of providing air bag protection for an automobile that does not have air bags built into the automobile.

In another embodiment, the harness or garment may be separated from the automobile, such that it may be worn as an ordinary garment, under a garment, or about a garment in a fashionable manner when the user is away from the automobile, and may be reattached upon returning to the automobile.

The present invention provides a seat belt and supplemental restrain system that includes a number of harness belts, forming, in a preferred embodiment, a five-point harness system, or bars and straps that keep a passenger in his seat and which can include a number of air bags, in association with the harness belts, bars and straps, such that one or more air bags will, upon vehicle impact, inflate upon and about the passenger rather than towards the passenger. In the preferred embodiment of the present invention, means to attach a restraint harness system or a jacket to the automobile seat are provided. The passenger may be seated within the harness system or jacket and, thus, be provided with a number of belts and/or bars and surrounding air bags, such that injury will be prevented by keeping the passenger in his seat and providing cushioning air bags to surround and protect the passenger. It is to be understood that the restraint system of the present invention may be provided with crash detection sensing devices and may be connected to the vehicle in such a fashion as to utilize crash sensors present in the vehicle and/or which are well known to persons having skill in the art.

In a further embodiment of the present invention a supplemental restraint system that can resemble an ordinary jacket, such as a leather jacket or a wind-breaker, is envisioned. The jacket has means for sensing that an accident or impact has occurred, or has means to attach the jacket to external sensors or to the sensors conventionally found in a vehicle. The passenger puts the jacket on, in the way one would normally put a jacket on, and sits in the vehicle. The restraint system built into the jacket, including a means to attach the person to the vehicle seat, such as a wide band of jacket material (which can be as wide and tall as the entire back area of the jacket) is slid over the vertical portion of car seat-back, so as to restrain the person in the seat, and air bags, are built into the jacket.

The supplemental restraints of the present invention provide a means to protect the passenger with a system that is as easy to use as putting on a jacket.

The reason for the present invention is to provide a solution to the problems found in prior art seat belts, air bags and child restraint systems.

When air bags deploy, the speed and direction of the air bag is directly in the reverse direction of travel of the vehicle and the passengers. Accordingly, the impact of the passenger and air bag will be at a velocity that can be derived based on the velocity of the vehicle, its deceleration due to the impact, and the weight of the passenger in an additive manner. In the present invention, the moving speed and direction of passengers will be almost the same as the moving direction of the air bag deployed, thereby giving the passenger an almost zero extra impact from the air bag deployment.

Further, due to the design of seat belts, passengers are not protected fully and may be injured at the points of contact with the seat and shoulder belt on the body. The new design solves these problems by providing restraint over a wider area. In one case, bars and straps are used to restrain the passenger to the seat, in one embodiment, and in another embodiment, the passenger may be restrained though out his entire back.

A more detailed explanation of the invention is provided in the following description and claims and is illustrated in the accompanying drawings.

BRIEF DESCRIPTION OF THE DRAWINGS

FIG. 4 is a perspective view of a supplemental restraint system of the present invention.

FIG. 5 is a perspective view of the supplemental restraint system of FIG. 4 placed on an automobile seat and being used by a person.

FIG. 6 is perspective view of the supplemental restraint of FIG. 5 in a deployed position.

FIG. 7 is a perspective view of another embodiment of the supplemental restraint system of the present invention.

FIG. 8 is another view of the supplemental restraint system of FIG. 7.

FIG. 9 is a perspective view of another embodiment of the supplemental restraint system of the present invention.

FIG. 10 is another view of the supplemental restraint system of FIG. 9.

FIG. 14 is a perspective view of various accessories for use with the supplemental restraint system of FIG. 11.

FIG. 14a is a perspective view of various accessories for use with the supplemental restraint system of FIG. 11.

FIG. 16 is a cut-away planar view of an energy absorption pad used in the present invention.

FIG. 17 is a cross-sectional view, taken along line 17—17 of FIG. 16, of the air cellular cushioning layers of the energy absorption elements in the pad of FIG. 16.

FIG. 18 is an elevational view of a segment of a harness of the present invention.

FIG. 19 is a perspective view of a harness of the present invention.

DETAILED DESCRIPTION OF THE ILLUSTRATIVE EMBODIMENT

Figure 1:
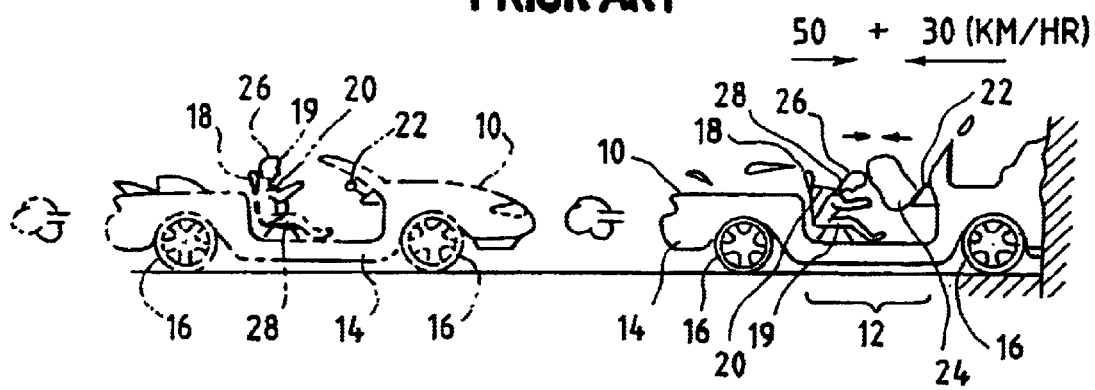
FIG. 1 is a schematic view of an automobile accident showing the results of an accident in an automobile having restraint systems of the prior art.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

Figure 2:
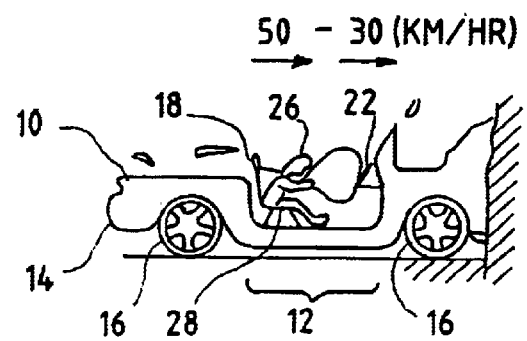
FIG. 2 is a schematic view of an automobile accident showing the results of an accident in an automobile having a restraint system of the present invention.
Figure 3:
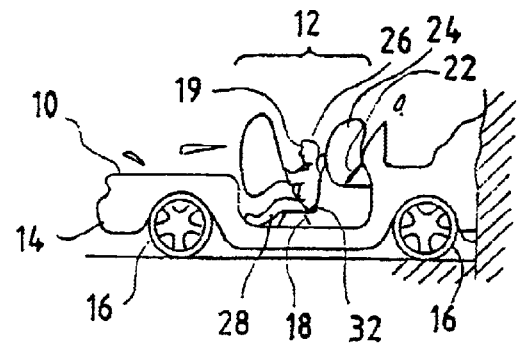
FIG. 3 is a schematic view of an automobile accident showing the results of an accident in an automobile having a restraint system of another embodiment of the present invention.

Referring to the drawings, FIGS. 1 through 3 show, schematically, the results of an accident in a vehicle 10 equipped with the restraint systems 12 of the prior art (FIG. 1), and of the present invention (FIGS. 2 and 3). Vehicle 10 comprises a body 14, wheels 16 a passenger seat 18, a shoulder and seat belt 20 a steering wheel 22 and an air bag 24. As can be seen in FIG. 1, the impact of an accident in a vehicle 10 traveling at a speed of 50 kph at the moment of impact, causes the deployment of air bag 24, generally at 30 kph, out of steering wheel 22 towards the passenger 19. As a result of the accident, passenger 19 is thrown forward by the inertia of the accident and is held by belt 20. It may be seen in FIG. 1, that passenger 19 has had its head 26 thrown forward by the impact because passenger's 19 torso 28 has been restrained by belt 20. It will be understood by persons having skill in the art, that while the terms automobile and vehicle are used, somewhat interchangeably within the specification and claims, herein, the device of the present invention can be used in any type of vehicle, including automobiles, trucks, off-road vehicles, utility vehicles, sport utility vehicles, snow-mobiles, motorcycles, ATV's, boats, other water vehicles, airplanes, jets, rocket ships and other vehicles useable on land, in the water, in the air or in space, without limitation, without departing from the novel scope of the present invention.

FIG. 2 shows a similar accident in a vehicle 10 equipped with the supplemental restraint of the present invention. As can be seen, passenger 19 is restrained against seat 28 by the jacket 30, shown in FIG. 6, of the present invention. Head 26 is thrown forward, however, it is restrained from striking steering wheel 22 (or the dash board or other surface for such a system deployed in the front passenger or other seating location in the vehicle) by air bag 24. In the device of the present invention, however, air bag 24 does not travel towards passenger 19, but instead travels with passenger 19, such that upon deployment, away from passenger 19, passenger 19's head 26 is gently supported by air bag 24. FIG. 3 shows another embodiment, wherein the passenger travels in a special seat 32, which allows passenger 19 to face away from the general direction of travel. Such travel has been found to be safer than forward facing travel, and in combination with the supplemental restraint of the present invention, provides an extremely safe manner of travel.

Referring now to FIG. 4, a restraint jacket 30 is shown. Restraint jacket 30 comprises a seat back sleeve 40, which in operation is placed onto the seat back 42 of a vehicle seat 18 (FIG. 5). Restraint jacket 30 further comprises shoulder bars 44 having head protection air bags 46 and main air bag 48. A system of jacket securing means 50 are also provided, as are means to anchor jacket 30 to a vehicle. FIG. 5 shows the placement of jacket 30 onto a vehicle seat and the position of jacket 30 on a person. FIG. 6 shows jacket 30 in a deployed condition, with air bags 46 and 48 deployed.

FIGS. 7 and 8 show a more conventional jacket 60 which provides similar protection as jacket 30, but which may be worn as a wind breaker or other jacket when not used in a vehicle. It is noted that for small children, jacket 60 allows the child to be dressed at home, and then installed into the vehicle, while being worn, such that placement of a child into a safe restraint system is almost as easy as placing a child onto a seat. Jacket 60 further comprises head protection air bags 62 and a main body air bag 64. Jacket 60 may be fashioned such that it may be closed using buttons or a zipper in a conventional manner. It is envisioned that various types of materials, including leather, vinyl, nylon, wool, cotton and other man made and natural fabrics may be used in the construction of jacket 60, such that jacket 60 is functional, comfortable (in all weather conditions) and stylish, without departing from the novel scope of the present invention. Jacket 60 further comprises a back sleeve 64 for securing jacket 60 and passenger 18 to a car seat in a manner similar to that illustrated in FIG. 5. It is envisioned that sleeve 64 may be made of the same material as jacket 60, so as to hide sleeve 60 when the jacket is worn away from the vehicle or may be made of contrasting materials, colors, or textures, to create a fashion statement of its own, all without departing from the novel scope of the present invention. Sleeve 64 may also be made such that it may be detached from jacket 60 is such a manner as to not effect the integrity of the restraint system of the present invention.

Referring now to FIGS. 9 and 10, another embodiment of the restraint jacket 130 of the present invention is shown. Restraint jacket 130 comprises a seat back strap system 140, which comprises a number of straps 142, having buckling mechanisms 143, attached to jacket 130 and arranged such that in operation jacket 130 may be placed onto the seat back 42 of a vehicle seat 18 (shown more clearly in FIG. 5). In this manner, restraint jacket 130 may be anchored to the car 10 through seat back 42. In a further embodiment of the present invention, the restraint jacket 130 further comprises shoulder bars having head protection air bags and main air bag, as shown and described with respect to FIGS. 4 and 5. In this manner, jacket 130 may be equipped with supplemental restraint systems similar to those described above.

Figure 11:
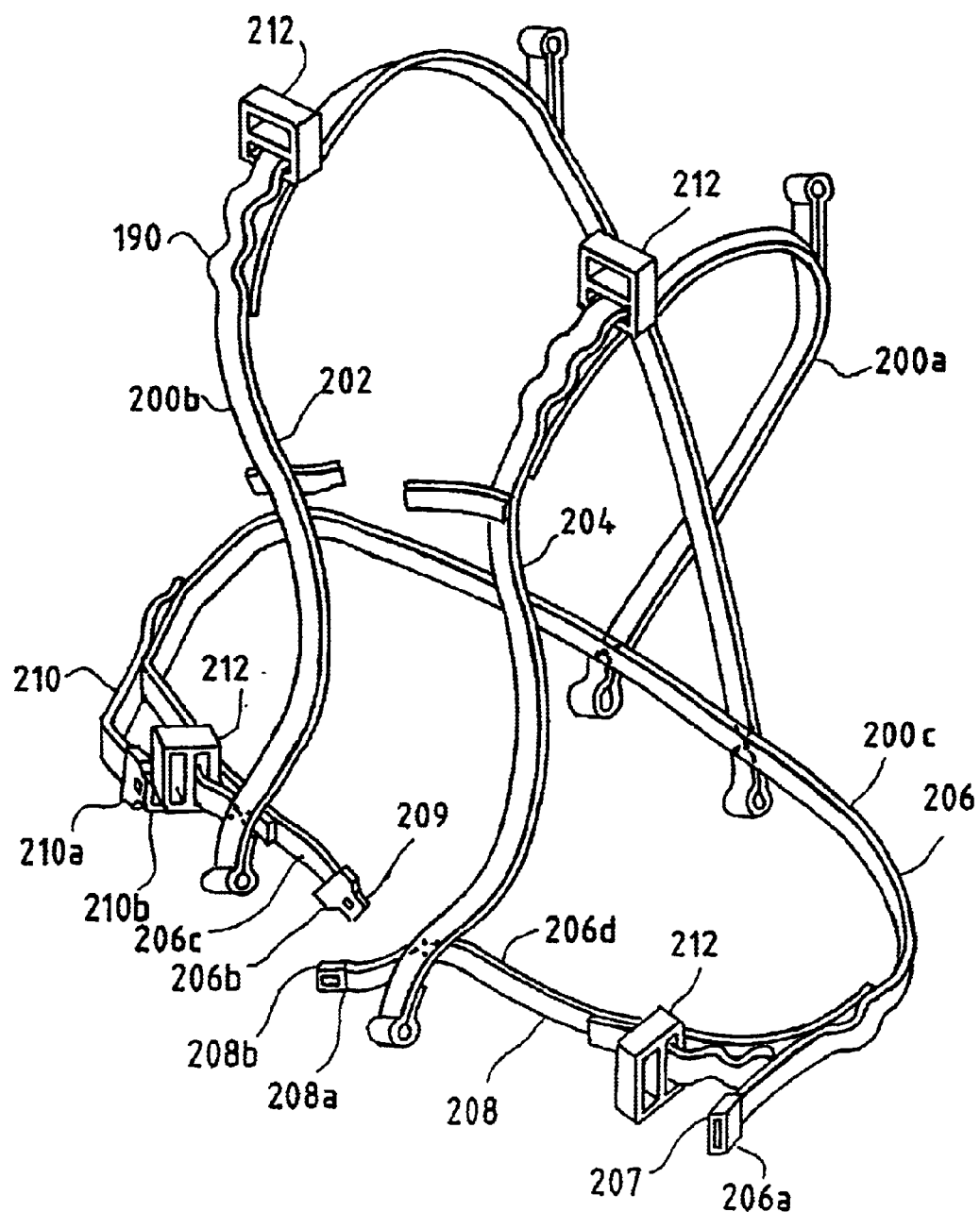
FIG. 11 is perspective view of another embodiment of the supplemental restraint system of the present invention.

Referring now to FIGS. 11–15a, another embodiment of the supplemental restraint system of the present invention, comprising a harness 190, is shown. In the present embodiment, a series of belts 200a–200g, of the type used to make seatbelts are used to form harness 190 for use about a person. As shown in FIG. 11, a first belt 202 and a second belt 204 are placed in a relative vertical orientation. Belts 202 and 204 are of a sufficient length such that they can reach from the front waist height of a user to the rear waist height of the user, passing over the user's shoulders, in a manner similar to that of a pair of suspenders or brace. In a preferred embodiment, the front portion of belts 202 and 204 are generally parallel to each other and the rear portions cross one over the other such that the rear portions forms an "X". It will be understood by persons having skill in the art that a different configuration of belts 202 and 204, including a configuration where the belts remain parallel in front and back, can be made without departing from the novel scope of the present invention. A third belt 206 is placed in a relative horizontal orientation relative to belts 202 and 204. As will be understood by persons having skill in the art, third belt 206 is attachable to belts 202 and 204 in manners well known in the art, such as by stitching, rivets, adhesives, combinations of these or other manners know to persons having skill in the art. Belt 206 comprises a first end 206a having a female lock receptor 207, a second end 206b having a male lock portion 209, an outside surface 206c and an inside surface 206d. Belt 206 is further provided with supplemental belt segments 208 and 210, which are attached to belt 206. Belt segment 208 is attached to the inside surface 206c near first belt end 206a and belt segment 210 is attached to the outside surface 206d near second belt end 206b. Belt segment 208 comprises a free end 208a having a male lock portion 208b and belt segment 210 comprises a free end 201a having a female lock receptor 210b. It will be seen that the attached combination of belt 206 and belt segments 208 and 210 are of a sufficient length to exceed the circumference of the user's waist. It will be understood by persons having skill in the art that means to expand and contract the length of each of belts 202, 204 and 206 can be provided, in a manner well known in the art, such that the series of belts 200 is completely adjustable to the height and girth of any user.

In a preferred manner of using the harness 190, the user places belts 202 and 204 about the shoulders and secures the belt combination 206, 208 and 210 such that male lock portion 209 on second belt end 206b is attached to female lock receptor 207 on first belt end 206a and male lock portion 208b at end 208a of belt segment 208 is attached to female lock receptor 210b at end 210a of belt segment 210, forming a cross-over belt configuration. It will be understood that a harness that does not include belt segments, such as belt segments 208 and 210 can be used, with the ends of the single belt 206 joining one another in a non-cross-over pattern, without departing from the novel scope of the present invention.

Figure 12:
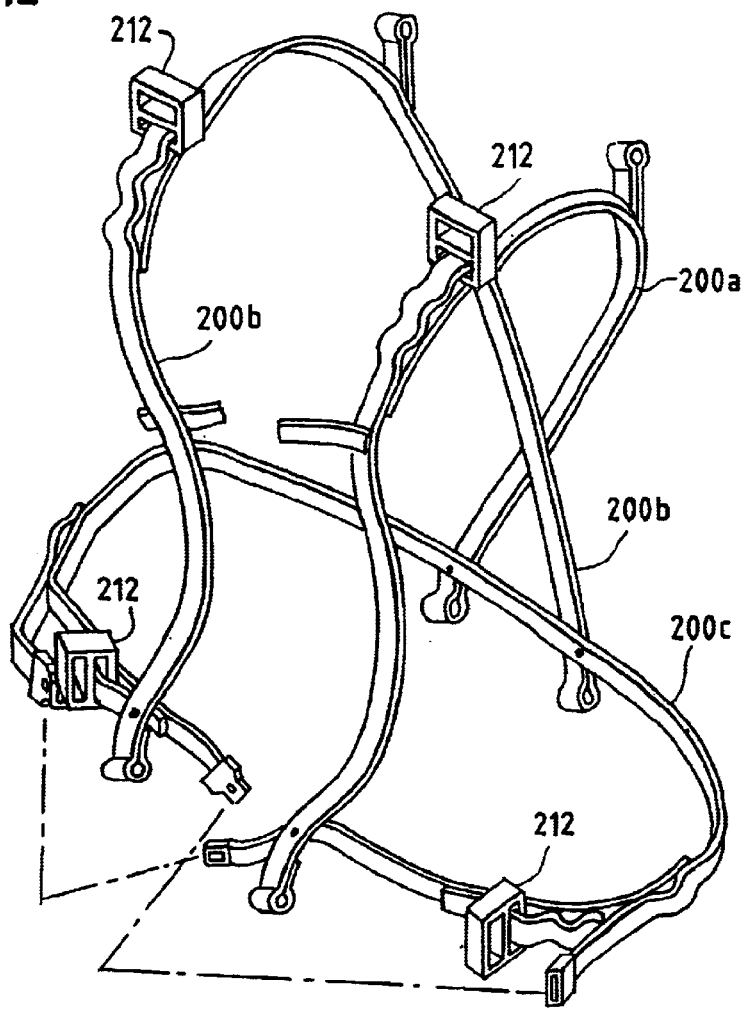
FIG. 12 is a perspective view of a method of use of the supplemental restraint system of FIG. 11.
Figure 12A:
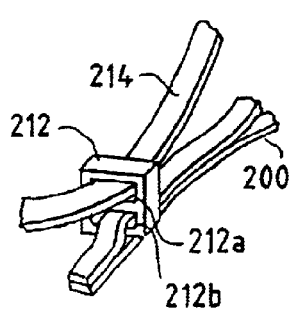
Figure 12B:
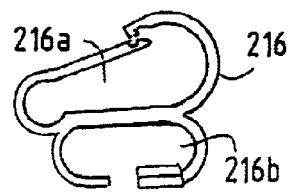
Figure 12C:
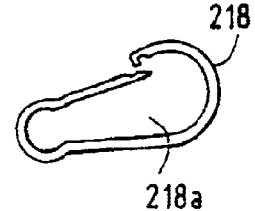
Figure 13:
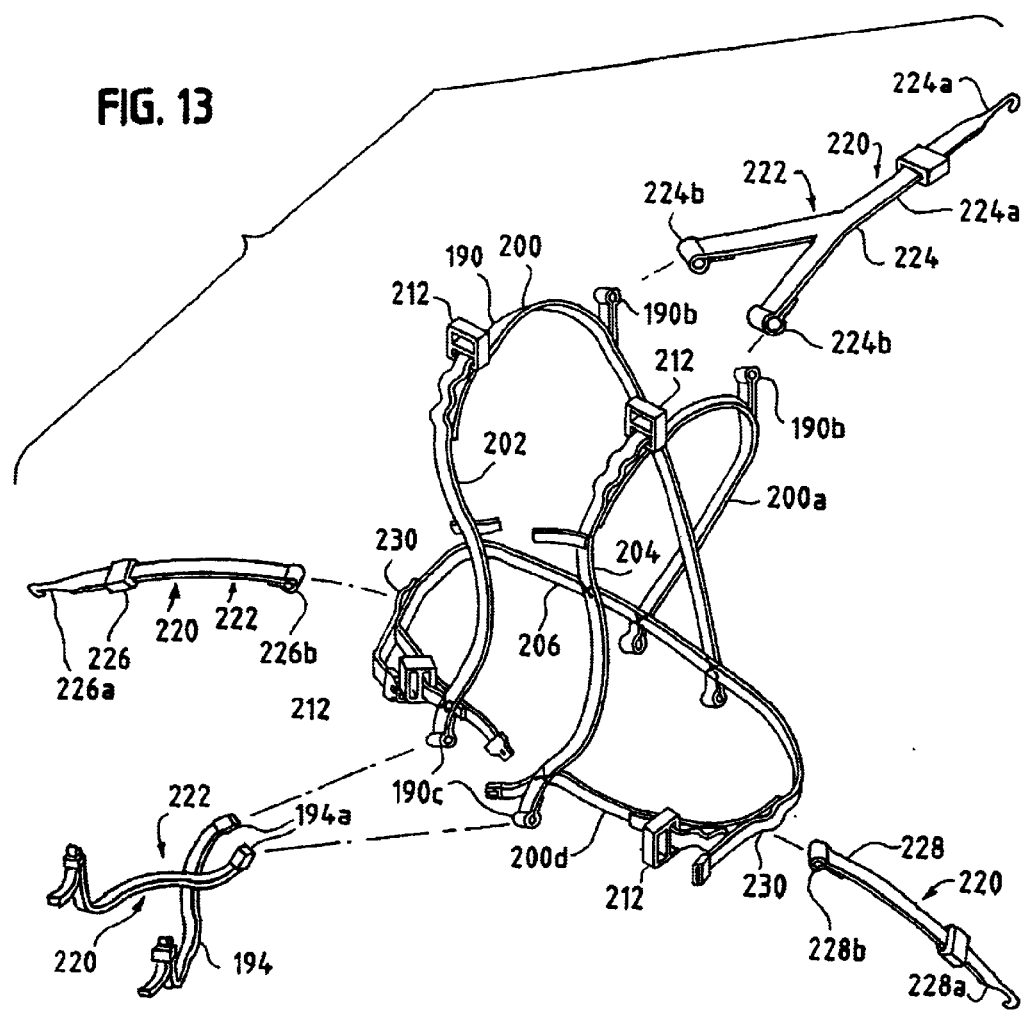
FIG. 13 is a perspective view of another method of use of the supplemental restraint system of FIG. 11.
Figure 13A:
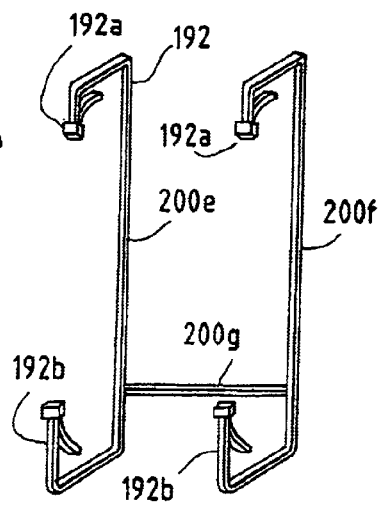

Referring now to FIGS. 12 and 13, two preferred concepts of using the harness 190 of the present invention are shown and described. Referring to FIG. 12, the harness 190, which is illustrated in FIG. 11, is provided with means 212 for attaching the harness to the seat and shoulder belt system of an automobile. In FIG. 12a, a plastic belt clip 212 is shown attached to belt 200 of harness 190, though a first opening 212a and shows a shoulder belt 214 slipped within a second opening 212b. When attached in this manner, harness 190 is secured to the automobile's restraint system, providing security for the user. FIGS. 12b and 12c illustrate different attaching means 216 and 218. It will be seen that attaching means 216 comprises a carabineer type latch 216a with a ring loop latch 216b. The two latches thus provided 216a and 216b, provide the same means of attachment as clip 212 and can be used to secure a shoulder belt 214 to belt 200 of harness 190. FIG. 12c shows a single carabineer 218 type latch having an opening 218c for attachment of a belt 200 to shoulder belt 214 of lap belt (not shown). It will be understood by persons having skill in the art that while plastic clips are shown and described, clips made of other materials, including metals, wood, synthetics and others, can be substituted without departing from the novel scope of the present invention.

Referring now to FIG. 13, the harness 190, which is provided with the attaching means 212 shown in FIG. 12, is also provided with tether means 220. In another embodiment, tether means 220, comprised of belts 222 of a type similar to those making up harness 190, are included in the second preferred concept. As illustrated, a first tether 224, comprising a "Y" shaped member having a tether clip 224a (for use with a National Transportation Safety Board required tether anchor) and two attachment means 224b, is provided. It will be understood that attachment means 224b can comprise any type of attachment device, including rings, carabineers, D-ring connectors, or other loop type fasteners, without departing from the novel scope of the present invention. First tether 224 is attachable to a tether anchor, at clip 224a and to two corresponding attachment locations 190b on harness 190. A second tether 226 and third tether 228, each having a tether clip, respectively 226a and 228a are provided, as well as attachment means, respectively 226b and 228a, for use in a manner similar to that described above for first tether 224, attachment means 226b and 228b each being attachable to one of two attachment points 230. Persons having skill in the art will understand that the harness 190 of the present invention can include one or both additional tether means 220 or neither tether means 220, while still providing protection superior to that presently available, without departing from the novel scope of the present invention.

In another embodiment extra harness support means are shown and described. While the use of these extra harness means may be desirable in some situations, it will be understood that the they are provided as redundant restraint systems. It will be seen, in FIG. 13, that a second harness means 192 and a third harness means 194, each of which can be comprised of belts 200 similar to those of first harness means 190, are provided as an alternative to first tether 224, second tether 226 and third tether 228. It will be understood that second 192 and third 194 harness means are particularly useful in older automobiles that do not have the newly required tether anchors. In the use of second 192 and third 194 harness means, second harness 192 means is draped about the automobile seat such that first end segments 192a are hung over the top of the seat and second end segments 192b are placed below the automobile seat. Third harness 194 is provided with means, at first end segments 194a, for attachment to attach locations 190c at the front ends of belts 202 and 204, in a manner similar to the attachment of first tether 224 described above. Third harness 194 is then attachable to second harness 192 using a male-female locking means such as those previously discussed. Second harness means is also attachable to first harness 190, at attachment locations 190b, in a manner similar to that previously described above with respect to first tether 224.

Figure 15:
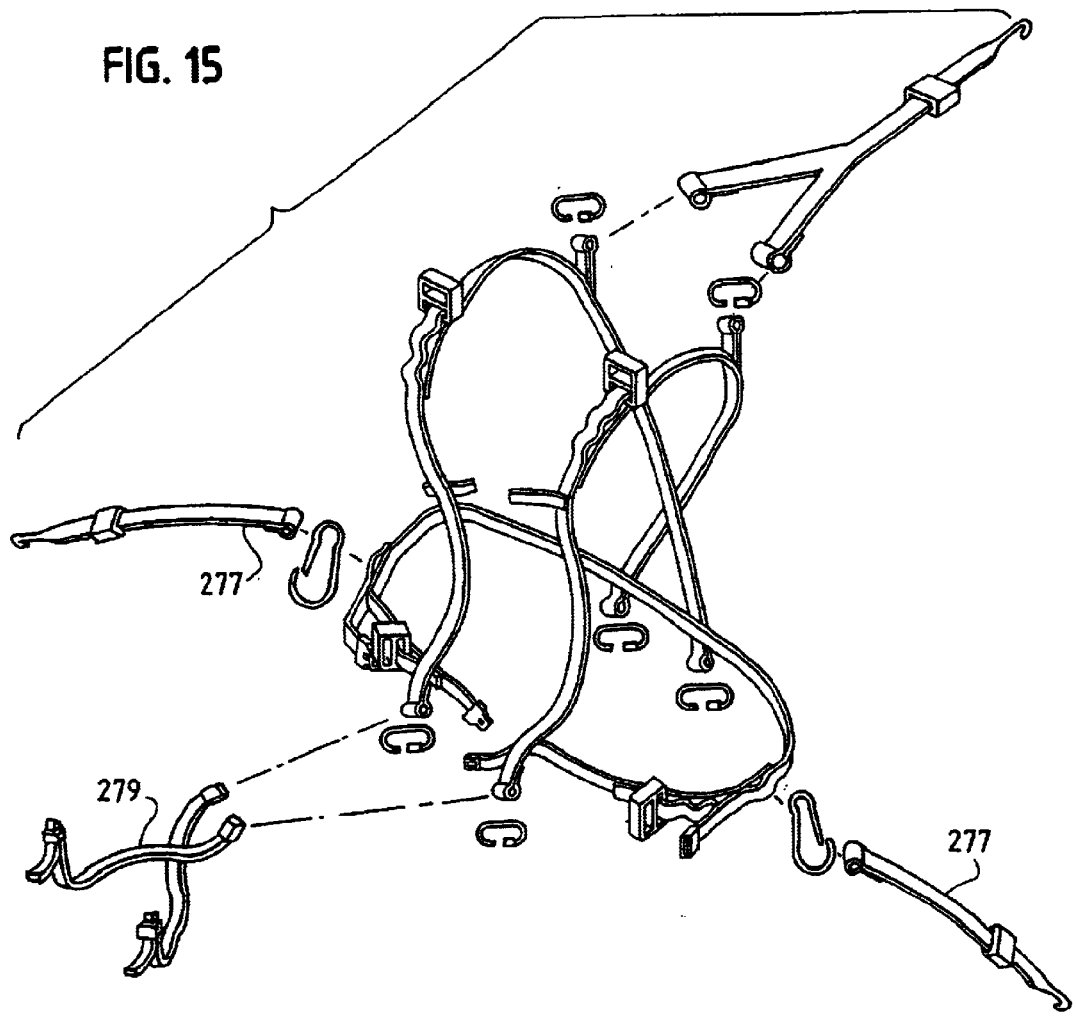
FIG. 15 is a perspective view of various accessories for use with the supplemental restraint system of FIG. 11.
Figure 15A:
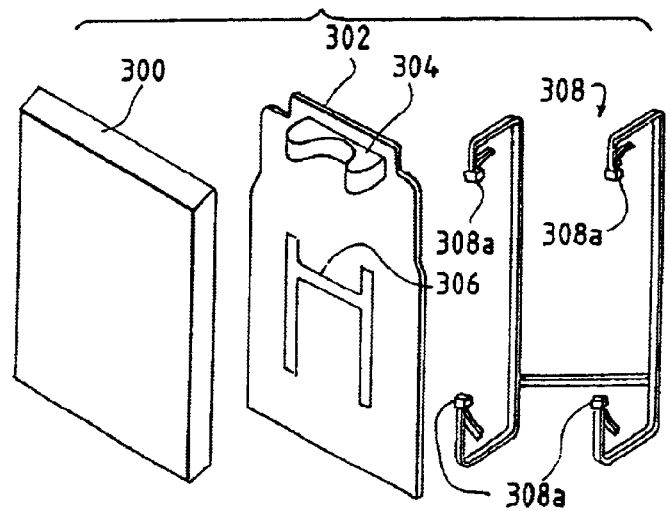
FIG. 15a is a perspective view of various accessories for use with the supplemental restraint system of FIG. 11.

FIGS. 14 and 15 illustrate various accessories and systems for attaching the various components to the supplemental restraint systems described herein. It will be understood, by persons having skill in the art, that other types of connection means and systems can be used without departing from the novel scope of the present invention.

Referring now to FIG. 14, harness 190 is shown in use with a Y-shaped tether 275. It will be seen that harness 190 and tether 275 may be connected using D-ring connectors 217. It will be understood by persons having skill in the art, that any type of connector, including but not limited to all of those previously discussed, and others, may be used without departing from the novel scope of the present invention. It will also be understood that tethers comprising single straps 277 (FIG. 15) and comprising four straps 279, as well as other tethers, can be utilized to secure harness 190 to a vehicle, without departing from the novel scope of the present invention. As shown in FIG. 14, tether 275 can be of the type having adjustment means 275a, such that tether 275 may be made larger or smaller as needed or desired. Tether 275 is also shown as having a self locking hook 275b of a type well known in the art and now associated with vehicle anchor tethers required in newer vehicles.

Referring now to FIG. 15, a foam backrest 300 is provided to allow a smaller person, or child, to sit on the vehicle seat and be placed in position to have the vehicle shoulder belt reach the correct location on the user's shoulder. It will be understood by persons having skill in the art, that backrest 300 may be constructed of any type of cushioning and resilient materials without departing from the novel scope of the present invention. A back support 302 is also show and can be attached, with such means as hook and eye fasteners 306, to backrest 300, to allow for the use of a neck restraint 304, or a headrest (and neck restraint combination) 394 (FIG. 20) as explained below, in association with the harness 190 of the present invention. Further, as another accessory, a four point harness tether 308 is shown. It will be understood that harness tether 308 can be places about the back of a vehicle seat with its ends 308a being brought towards the front of the vehicle seat such that end 308a can be connected to various connection points (such as points 212) on harness 190, without the need for a tether anchor in the automobile. The use of harness tether 308 is particularly useful in older vehicles and in vehicles where tethers are not provided in front seats and in other locations where tether anchors are not available.

In a preferred embodiment of the present invention, a jacket, a vest, a harness or other security device is created in the manner described above, and includes pads and elasticized members which allow the user to better survive an accident or other incident. While padding has long been a method of energy absorption, the types of energy absorption devices and the manner of their use in association with the devices of the present invention, provides a superior and previously unknown type of safety protection.

Referring now to FIG. 16, an energy absorption pad 350 is shown being comprised of four elements. In a preferred embodiment, the layers of pad 350, are comprised of a first high density layer 352 and a second low density layer 354. Persons having skill in the art will recognize that first and second layers (352 and 354) may be created of such products as Ethafoam® (particularly Ethafoam® 221) made by Dow Chemical Company of Midland, Mich.

Sandwiched between the low-density layer 354 and high-density layer 352 are at least two layers of air cellular cushioning 356 and 358. As shown in FIG. 16, air cellular cushioning layer 356 is placed such that the air cells 356a face the air cells 358a of layer 358. In a preferred embodiment of the present invention, the air cellular cushioning layers (356 and 358) are placed facing each other such that the air cells (356a and 356b) of one layer are centered over the gaps (356b and 358b) of the other layer such that an interlocking of air cells can be achieved to provide a more thorough cushioning effect. The cushioning effect is improved in this manner as no nodes, created by gaps in both cell layers, occurs in the same place on the cushion. In one preferred embodiment, each cell layer (356 and 358), comprises air cells (356a and 356b) of different sizes than the other. It will be understood by persons having skill in the art, that any number of air cellular layers may be employed in the present device without departing from the novel scope of the present invention. Persons having skill in the art will recognize that such air cellular cushioning as Air Cap® and Bubble Wrap® made by Sealed Air Corporation of Saddle Brook, N.J., can be used in creating the energy absorption pad 350 of the present invention. It will be understood by persons having skill in the art that layers 350, 352, 354 and 356 may be attached together using any know process and method, including heat sealing, adhesives or fasteners, without departing from the novel scope of the present invention.

Referring now to FIG. 18, a portion of a tether 370 (similar to that shown in FIGS. 13, 14 and 15) is shown having an elasticized pad portion 372 attached thereto. Tether 370 can be of the type having adjustment means 370a, such that tether 370 may be made larger or smaller as needed or desired. Tether 370 is also shown as having a self locking hook 370b of a type well known in the art and now associated with vehicle anchor tethers required in newer vehicles. As described above, tether 370 (and the others previously shown and described) are instrumental in attaching a jacket, vest or harness of the present invention to the frame of an automobile. As shown in FIGS. 18 and 19, tether 370 has the added feature of having an elasticized pad 372 attached to the one side of long leg 374 of the generally Y-shaped tether 370, in such a manner as to allow energy from a sudden stop or impact, to be absorbed within the elasticized pad 372 so that the pull of tether 370 onto a jacket, vest or harness of the present invention, is tempered. In the manufacture of tether 370, material on leg 374 is bunched up into a series of undulations 370c along the longitudinal axis 376 of leg 374. In a preferred embodiment of the present invention, tether 370 is attached to pad 372 by a series of stitch lines 378 made in the valleys 380 of undulations 370c. When tether 370 is attached to a jacket, vest or harness of the present invention and to an automobile tether hook and forward stress (due to an accident or a sudden stop) causes the user to move towards the front of the vehicle, pad 372 will stretch, along with the undulations 370c of tether 370, absorbing the energy of the forward movement. The tether will, then, more slowly cause the user to stop its forward motion, rather than causing the typical snap-back response caused by a tether of the prior art. The user is thereby less likely to receive such ill effects as whiplash and muscle strains.

In a preferred embodiment, elasticized strap is constructed of Polyether Foam Grade 11054000 manufactured by General Foam of Paramus, N.J., and heavy-duty woven elastic, style 6511TG from Lea & Sachs, Inc. of Des Plaines, Ill. However, it will be understood by persons having skill in the art that any type of elasticized products, including other products manufactured by the above noted companies and products of other companies, that can be formed into a desired shape and having the desired properties of providing a cushioning and pulling effect to a tether, can be used without departing from the novel scope of the present invention.

In another preferred embodiment of a supplemental restraint system, such as the one shown in FIG. 20, a vest 390 is provided having a harness 396 comprising straps and belts and buckles, as described below. It will be seen that two buckles 397 are used in the preferred embodiment shown in FIG. 20, one at lap level and another at generally the midriff level. While two buckles 397 are shown in the embodiment of FIG. 20, it will be understood by persons having skill in the art, that more or fewer belts and buckles can be used without departing from the novel scope of the present invention.

Figure 20:
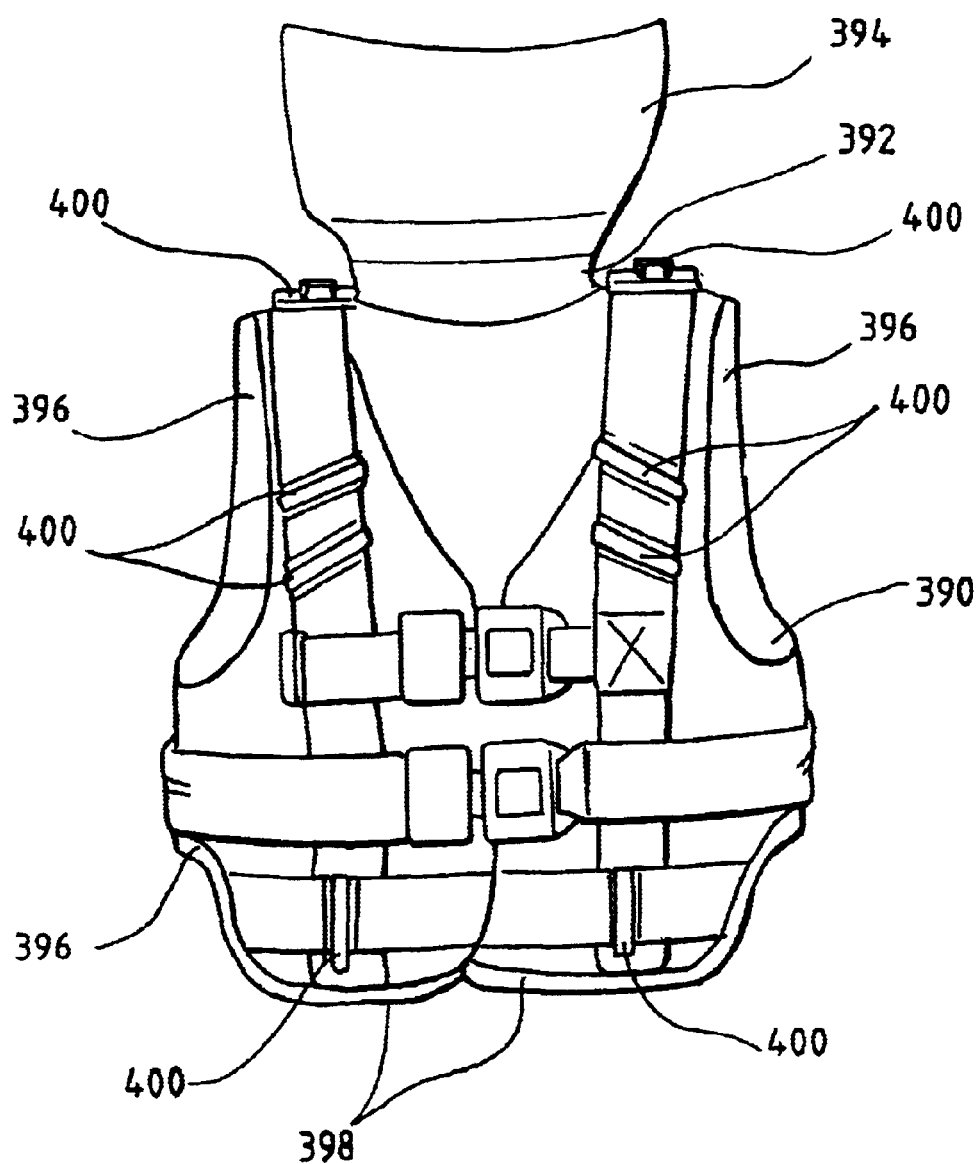
FIG. 20 is a perspective view of another embodiment of a vest made in accordance with the teachings of the present invention.

The vest 390, of FIG. 20, is shown in conjunction with a back support and headrest, similar to that shown as back support 302 and neck restraint 304 in FIG. 15. Back support 392 is removably attachable to vest 390 by means of any manner of cloth fastening, including but not limited to hook and eye fasteners such as Velcro® fasteners. An optional headrest 394 is attachable to back support 392 by similar means, and provides additional comfort and protection to the user. It will be understood by persons having skill in the art that the present invention can be practiced without the inclusion of back support 392 and/or headrest 394 shown in FIG. 20. It will also be understood that while a type of back support 392 and headrest 394 are shown in FIG. 20, any manner of providing additional back support and protection as well as neck and headrest or support may be included without departing from the novel scope of the present invention.

Back support 392, headrest 394 and vest 390 are all made of durable material, which can be made such that they are comfortable to use and wear and can easily be cleaned and maintained. Further, back support 392, headrest 294 and vest 390 can include the padding materials shown in FIGS. 16 and 17, such that they can absorb the energy of an impact while remaining light weight and comfortable.

As shown in FIG. 20, vest 390 is generally a cloth vest 390 having padding, as described above, and a harness 396, such as that shown in FIGS. 9, 11, 12, 13, 14 and 15. It will be understood that harness 396 can be merely placed onto a vest 390, in the same manner that a harness can be placed onto a child over the child's clothing in the practice of the present invention where a harness (such as those shown in FIGS. 11, 12, 13, 14 and 15) alone is used. In a preferred embodiment, however, the vest 390 and harness 396 are attached together; typically by use of stitching or by other fastening means, including but not limited to the use of hook and eye fasteners (such as Velcro®) and others. Persons having skill in the art will understand that the use of vest 390, in association with harness 396, gives the wearer more comfort and a more stylish appearance that use of the harness alone would provide. Further, the wearer is provided with extra padding, within vest 390 (as described above), and an area, that is the back side of vest 390, onto which a back support 392 and headrest 396 can be attached and more firmly held in place.

It will be seen that the vest 390 shown in FIG. 20 is constructed to include a lap covers 398 extending from each of the front segments of vest 390. Lap covers 398 are designed to cover the buckle of automobile seat belt (not shown) such that the seat belt is neutralized as a potential harmful element in the event of an automobile impact. Further, as noted above, vest 390 has been designed to include two front buckles 397 on harness 396 to provide a desirable degree of closure of vest 390, so that the wearer remains in the vest 390, and therefore buckled to the vehicle, in all eventualities. It has been found that a buckle 397 at waist level and a second buckle 397 at mid-chest level provides an excellent means to keep a wearer safe during a jarring incident (such as an accident). It will be understood by persons having skill in the art that while two buckles 397 are shown, the use of one or more than two buckles 397 in a supplemental restraint device (harness, jacket, vest, etc.) is within the scope of the teachings of the present invention.

Vest 390, as illustrated, further includes means 400, as described above with respect to other embodiments of the invention, to connect harness 396 to the seat belt system of an automobile. It will be seen that the design of vest 390 is such that it has an appealing appearance such that the user, typically a child, will enjoy wearing vest 390. In this manner the child is encouraged to wear the supplemental restraint system protecting the wearer.

It will be understood, by persons having skill in the art, that while reference has been made to children or a child as the wearer or user of the illustrated and described devices of the present invention, the manufacture and use of appropriately sized devices for adults and teenagers, persons of any age, as well as the use of the device(s) of the present invention with animals, is contemplated and does not present a departure from the novel scope of the present invention.

Although illustrative embodiments of the invention have been shown and described, it is to be understood that various modifications and substitutions may be made by those skilled in the art without departing from the novel spirit and scope of the invention.

What is claimed is:

1. A supplemental restraint system for use in a vehicle comprising:
   a harness comprising a plurality of belts for attachment to the restraint system of an automobile;
   a vest having padding, comprising a plurality of layers of energy absorbing foam and air cellular cushioning layers;
   the harness and vest being wearable by a rider in the vehicle such that when the rider wears the vest the rider is secured to the seat of the automobile and the rider remains secured against the seat of the automobile notwithstanding the motion of the vehicle;
   wherein said padding comprises a first a high density foam layer, a second low density foam layer and first and second air cellular cushioning layers.

2. The supplemental restraint system of claim 1, wherein the belts are arranged such that the vehicle restraint system, comprising a lap belt, works in conjunction with the harness.

3. The supplemental restraint system of claim 1, wherein the belts are arranged such that the vehicle restraint system, comprising a lap belt and shoulder belt, works in conjunction with the harness to form a five-point restraint system.

4. The supplemental restraint system of claim 1, including one or more tethers securing the harness to the seat.

5. The supplemental restraint system of claim 4, wherein the one or more tethers is generally Y-shaped and comprises a longitudinal axis and a first, second and third leg, the first leg, being generally along the longitudinal axis, having an elastic pad attached thereto.

6. The supplemental restraint system of claim 5, wherein the material forming the first leg is undulated along the longitudinal axis, forming hills and valleys of material, and the material is attached to the elastic pad at the valleys of the undulations.

7. The supplemental restraint system of claim 1, wherein the restraint system of the vehicle includes at least one tether anchor and the supplemental restraint system includes at least one tether attachable to the harness and the tether anchor.

8. The supplemental restraint system of claim 4, wherein the tether comprises a strap having a first and second end, the first end of the strap being attachable to the harness and the second end of the tether being attachable to a tether anchor.

9. The supplemental restraint system of claim 1, wherein the vest includes lap extension pads which cover the lap of a wearer when the wearer is seated.

10. The supplemental restraint system of claim 9, wherein the lap extension pads extend so as to cover a buckle from a seat belt used in association with the supplemental restraint system.

* * * * *